United States Patent
Skiba et al.

(10) Patent No.: US 9,451,085 B2
(45) Date of Patent: Sep. 20, 2016

(54) SOCIAL MEDIA PROVOCATEUR DETECTION AND MITIGATION

(71) Applicant: Avaya Inc., Basking Ridge, NJ (US)

(72) Inventors: David Skiba, Golden, CO (US); George W. Erhart, Loveland, CO (US); Lee Becker, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 244 days.

(21) Appl. No.: 14/047,812

(22) Filed: Oct. 7, 2013

(65) Prior Publication Data

US 2014/0304343 A1     Oct. 9, 2014

Related U.S. Application Data

(60) Provisional application No. 61/809,737, filed on Apr. 8, 2013.

(51) Int. Cl.
| | |
|---|---|
| G06F 15/16 | (2006.01) |
| H04M 3/51 | (2006.01) |
| G06F 17/28 | (2006.01) |
| G06Q 50/00 | (2012.01) |
| G10L 15/18 | (2013.01) |
| H04L 12/58 | (2006.01) |
| G06F 17/27 | (2006.01) |

(52) U.S. Cl.
CPC ............ *H04M 3/5175* (2013.01); *G06F 17/27* (2013.01); *G06F 17/28* (2013.01); *G06Q 50/01* (2013.01); *G10L 15/1822* (2013.01); *H04L 51/046* (2013.01); *H04L 51/32* (2013.01); *G10L 15/18* (2013.01)

(58) Field of Classification Search
CPC ................................ G06F 17/27; G06F 17/28
USPC .......................................................... 709/206
See application file for complete search history.

(56) References Cited

U.S. PATENT DOCUMENTS

| | | | | |
|---|---|---|---|---|
| 2012/0016948 | A1* | 1/2012 | Sinha | G06Q 10/10 709/207 |
| 2012/0158851 | A1* | 6/2012 | Kelmenson | G06F 17/30864 709/205 |
| 2012/0290950 | A1 | 11/2012 | Rapaport et al. | |
| 2013/0091223 | A1* | 4/2013 | DeLuca | G06Q 10/10 709/206 |
| 2014/0189002 | A1* | 7/2014 | Orioli | H04L 67/22 709/204 |

FOREIGN PATENT DOCUMENTS

EP         2216743         8/2010

* cited by examiner

*Primary Examiner* — Chris Parry
*Assistant Examiner* — Weiwei Stiltner
(74) *Attorney, Agent, or Firm* — Sheridan Ross P.C.

(57) ABSTRACT

A contact center system can receive messages from social media sites or centers. The messages may include derogatory or nefarious content. The system can review messages to identify the message as nefarious and identify the poster as a social media provocateur. The system may then automatically respond to the nefarious content. Further, the system may prevent future nefarious conduct by the identified social media provocateur by executing one or more automated procedures.

20 Claims, 11 Drawing Sheets

SOCIAL MEDIA PROVOCATEUR DETECTION AND MITIGATION

RELATED APPLICATIONS

This application claims priority to U.S. Provisional Application 61/809,737, filed Apr. 8, 2013, entitled "SENTIMENT FOR USE IN CONNECTION WITH CONTACT CENTER COMMUNICATIONS," which is incorporated herein by reference for all that it teaches and for all purposes.

BACKGROUND

Communication with customers and the importance of addressing customer concerns continues to grow in importance. However, there are a small group of people that are simply looking to cause mayhem, dissent, or anger in the people using social media. These people are called social media provocateurs, trolls, etc. Culling this group of people from customers with real concerns is a growing problem.

There are typically three types of provocateurs: repeat haters are people who use multiple identities, often to escalate an issue that's small (i.e., amplify complaint); threadjackers are people who deliberately go off-topic, make off-color remarks, misdirect, bait and switch, engage in non-productive name calling, etc.; and fake account creators are people who create accounts with names similar to a company to answer questions from customers to cause trouble. It would be useful to triage (sort, sift, select) and respond to the damage caused by the three types of troublemakers before issues escalate.

Typically, companies monitor sites for trolling, flaming, and spamming. Users may be banned when an incident occurs. Registration requiring user information is often used as a deterrent. Laws like the Communications Act 2003 in the United Kingdom allow for prosecution of bad Internet behavior. However, these efforts are not efficient or timely. It would be useful to triage (sort, sift, select) and respond to the damage caused by the three types of troublemakers before issues escalate.

SUMMARY

It is with respect to the above issues and other problems that the embodiments presented herein were contemplated. Embodiments include a method comprising: a processor detecting nefarious conduct associated with a social media message; the processor routing the social media message to an agent; and the processor automatically minimizing the impact of the nefarious conduct.

An aspect of the above method includes wherein detecting nefarious conduct associated with a social media message comprises detecting a provocateur associated with the social media message.

An aspect of the above method includes wherein detecting a provocateur associated with the social media message comprises: determining a source of the social media message; comparing the social media message with an organizational message; identifying an incongruency between the social media message and the organizational message; and providing the identified provocateur to an agent.

An aspect of the above method includes wherein the incongruency identifies an imposter.

An aspect of the above method includes wherein detecting a provocateur associated with the social media message comprises: associating two or more social media posters; comparing the two or more social media posters with information in a past social media message; identifying the two or more social media posters as a team; and providing information associated with the team to an agent.

An aspect of the above method includes wherein the team is a social media troll.

An aspect of the above method includes wherein detecting a provocateur associated with the social media message comprises: identifying at least one of a common word or a common phrase in the social media message; comparing the at least one common word or common phrase to at least one common word or phrase stored in a past message database; identifying commonality between at least one common word or one common phrase; and providing information about the commonality to an agent.

An aspect of the above method includes wherein the commonality identifies the social media provocateur.

An aspect of the above method further compromises the processor automatically preventing future nefarious conduct.

An aspect of the above method includes wherein the processor executes an automated response in response to the identified social media provocateur.

Embodiments include a computer readable medium having stored thereon processor executable instructions that cause a computing system to execute a method, the instructions comprising: instructions to detect nefarious conduct associated with a social media message, wherein detecting nefarious conduct associated with a social media message comprises detecting a provocateur associated with the social media message; instructions to route the social media message to an agent; and instructions to minimize automatically the impact of the nefarious conduct.

An aspect of the above computer readable medium includes wherein the instructions to detect a provocateur associated with the social media message comprises: instructions to determine a source of the social media message; instructions to compare the social media message with an organizational message; instructions to identify an incongruency between the social media message and the organizational message, wherein the incongruency identifies an imposter; and instructions to provide the identified provocateur to an agent.

An aspect of the above computer readable medium includes wherein the instructions to detect a provocateur associated with the social media message comprises: instructions to associate two or more social media posters; instructions to compare the two or more social media posters with information in a past social media message; instructions to identify the two or more social media posters as a team, wherein the team is a social media troll; and instructions to provide information associated with the team to an agent.

An aspect of the above computer readable medium includes wherein the instructions to detect a provocateur associated with the social media message comprises: instructions to identify at least one of a common word or a common phrase in the social media message; instructions to compare the at least one common word or common phrase to at least one common word or phrase stored in a past message database; instructions to identify commonality between at least one common word or one common phrase, wherein the commonality identifies the social media provocateur; and instructions to provide information about the commonality to an agent.

An aspect of the above computer readable medium further compromises instructions to prevent automatically future nefarious conduct.

Embodiments include a communication system comprising: a social media gateway in communication with a social media network, the social media gateway operable to receive a social media message on the social media network; a dialog system in communication with the social media gateway, the dialog system operable to analyze the social media message, wherein the dialog system compromises: a analysis tools component that is operable to receive and analyze the social media message, wherein the text processing component compromises: a provocateur detector module operable detect nefarious conduct associated with a social media message, wherein detecting nefarious conduct associated with a social media message comprises detecting a provocateur associated with the social media message; an incident routing module in communication with the provocateur detector module, wherein the incident routing module is operable to route the social media message to an agent; and an impact minimizer module in communication with at least one of the provocateur detector module and the incident routing module, wherein the impact minimizer module is operable to minimize automatically the impact of the nefarious conduct.

An aspect of the above communication system includes wherein the provocateur detector module further comprises an imposter detector operable to: determine a source of the social media message; compare the social media message with an organizational message; identify an incongruency between the social media message and the organizational message, wherein the incongruency identifies an imposter; and provide the identified provocateur to an agent.

An aspect of the above communication system includes wherein the provocateur detector module further comprises a troll detector operable to: associate two or more social media posters; compare the two or more social media posters with information in a past social media message; identify the two or more social media posters as a team, wherein the team is a social media troll; and provide information associated with the team to an agent.

An aspect of the above communication system includes wherein the provocateur detector module further comprises a commonality detector operable to: identify at least one of a common word or a common phrase in the social media message; compare the at least one common word or common phrase to at least one common word or phrase stored in a past message database; identify commonality between at least one common word or one common phrase, wherein the commonality identifies the social media provocateur; and provide information about the commonality to an agent.

An aspect of the above communication system further compromises an incident preventer module operable to prevent automatically future nefarious conduct.

Generally, companies can manually monitor social media sites for trolling, flaming, and spamming, which requires significant time and resources. However, the element of prediction is missing from manual searches. The present system can be capable of detecting, providing specialized routing for, minimizing the impact of, and ultimately stopping damaging posts before those posts become devastating. Thus, the system uses techniques and combines them to discover and identify group activity, provide special routing, and learn what constitutes a real threat.

A first step in the process may be to identify that a problem is starting to develop using content and interaction analyses. A series of analyses may be instituted to analyze and match across posts, threads, and accounts. The analysis may include content and identity relational analysis and/or analysis of tag lines, phrases, styles, and composition signatures. Additional analyses may include pattern analysis of language and responses, including finding variations on a company name.

The second step may be routing the postings to specially trained agents and/or groups, which can be assigned to handle the trolling, flaming, and spamming. The specially-trained agents can use a variety of skills to address the problems and stop the offensive behavior. Agents can also be trained to help law enforcement by gathering certain data on the users.

The third step may be to minimize the impact of the postings by routing provocateurs to specially trained agents and pulling offensive posts early. Here, the object is to keep these events and comments from going viral and becoming potentially devastating. The company can create a "don't respond" message. The system might also "hide" the negative posts so that no one responds.

A final step may be preventing the conduct; by using several types of analyses, the system can learn what escalates and goes viral and what causes the most damage. As the system more accurately identifies the situations that escalate, the system can also more accurately predict and potentially intervene earlier as the posts arrive. Some examples of how the system and process may function are provided hereinafter.

In a first example, the system has detected that a recurring particular posted pattern shows up from DirtyDog, then from Troublemaker, then from SharkAttack, then from Bellyacher, and then from Astroturfer. The complaints are all similar and make an issue appear larger than it is. Once the connection is made between the posters, all posts by the users are sent to the special handling group and immediately removed from the social media page.

As a second example, the system has detected that a poster, Taylorsmith, commonly uses the phrases, "throw me in the briar patch," and "dead men tell no tales." Jamiejohnson also uses the phrases, "throw me in the briar patch," and "dead men tell no tales." Both Taylor and Jamie constantly provoke other users and hijack threads. While these are common phrases, they are not used frequently and would not appear together often. Using pattern analysis along with word/phrase usage analysis, the system determines that Taylorsmith and Jamiejohnson are the same user. Posts made by Taylorsmith and Jamiejohnson are routed for special handling. If necessary, legal action can be taken with information provided by the agent once the originator is located.

As a final example, the system is monitoring for a company name, CJet Airlines. The system detects similar company names on pages like CJET Airlines and CJet Airlines. There are complaints and questions which a non-company poster has responded inappropriately. Pages and posts are routed for special handling.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "provocateur" can refer to user of social media that attempts to illicit negative commentary or damages the reputation of an organization.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation, or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects can be separately claimed.

The term "in communication with" as used herein refers to any coupling, connection, or interaction using electrical signals to exchange information or data, using any system, hardware, software, protocol, or format.

A user context, an extended user context, and/or a user social context as used herein means information about a user of a social media network that can be used to determine a "value" of that user.

The term "social media network" or "social media" is a service provider that builds online communities of people, who share interests and/or activities, or who are interested in exploring the interests and activities of others. Generally, social media are web-based and provide a variety of ways for users to interact, such as e-mail and instant messaging services.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. Various changes may be made in the function and arrangement of elements of the embodiment without departing from the spirit and scope of the appended claims.

Figure 1A:
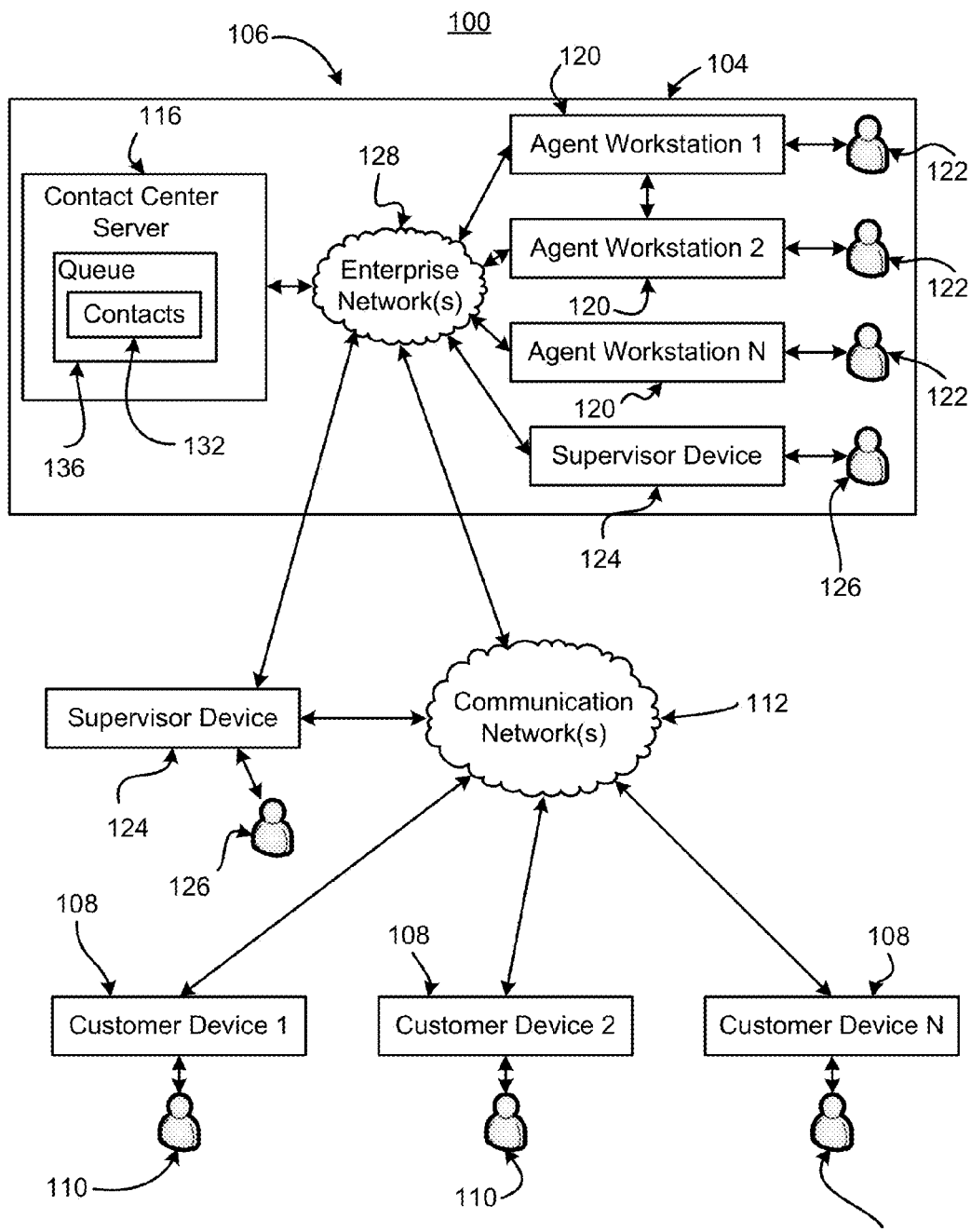
FIG. 1A is a block diagram of an embodiment of a communication system operable to interact with persons.

A block diagram depicting components of a communication system 100 is shown in FIG. 1A. In particular, the communication system 100 can include a contact center 104. In general, the contact center 104 can be in communication with one or more customer endpoints or devices 108 via one or more communication networks 112. Examples of customer endpoints 108 can include one or more of, but are not limited to, smartphones, desktop computers, laptop computers, or any other device capable of supporting communications between a customer and a customer service or other agent associated with the contact center 104 using written, oral, and/or electronic communications. Accordingly, communications between the contact center 104 and the customer endpoints 108 can comprise email, instant messaging, a telephone call, short message system, or other real time or non-real time communications. The communication network 112 can include the Internet, a local area network (LAN), wide area network (WAN), public switched telephone network (PSTN), wireless networks, or a plurality of networks in any combination.

The contact center 104 generally includes a call or contact center server 116, such as an automatic contact (or call) distribution system (ACD) server 116. The ACD server 116 is illustratively the Communication Manager™ enterprise communication-based ACD system available from Avaya Inc. The ACD server is interconnected to a plurality of agent workstations or endpoints 120. For example, the agent workstations 120 may be connected to the ACD server 116 by an enterprise network or networks 128.

The contact center server 116 generally functions to connect agent workstations 120 to customer devices or endpoints 108 through the communication network 112, to allow the agents 122 to service customer 110 contacts 132. The contacts can comprise written, electronic communications. However, contacts are not necessarily limited to written communications. For example, the contact center 106 can additionally handle voice contacts. As can be appreciated by one of skill in the art after consideration of the present disclosure, the contact center server 116 can maintain one or more queues 136 for organizing and maintaining or holding contacts 132 waiting for handling by a contact center agent 122. For example, a plurality of queues 136 can be provided to sort contacts according to various parameters. Agents 122 associated with the agent workstations 120 are assigned to provide services to contacts 132 that have been placed within one or more of the queues 136 based on availability and/or weighting factors. Moreover, the workstations 120, which can comprise general purpose computers, thin client devices, or other devices, generally support the delivery of customer contacts to associated agents 122, and to receive replies to the customer contacts from the agents 122. In addition, the agent workstations 120 can include a user output in the form of a display that can present a determined sentiment or sentiment indicator for a contact, or aggregation of contacts, to associated agents 122.

In addition, system 100, as described herein, can include one or more supervisor or administrator devices 124. The supervisor device 124 is generally in communication with the contact center server 116 via the communication network 112 and/or the enterprise network 128. For example, if the supervisor device 124 is on the premises of the contact center 104, communications with the contact center server 116 may be over a portion of the enterprise network 128 comprising a wired or wireless network. As another example, the supervisor device 124 may be in communication with the contact center server 116 over the communication network 112, for example via a cellular telephony data network, a wired or wireless connection outside of the enterprise network 128, or the like. In general, the supervisor device 124 comprises functionality that allows a supervisor 126 to monitor the health of the contact center 104, and to control aspects of the operation of the contact center 104. Moreover, the supervisor device 124 can present a sentiment indicator for a contact or aggregation of contacts to a supervisor 126. Accordingly, the supervisor device 124 can comprise any device, including a mobile device, capable of presenting information to a supervisor 126. Accordingly, examples of a supervisor device 124 include, but are not limited to, a tablet computer, a smartphone, a laptop computer, a desktop computer, a netbook, or the like.

Figure 1B:
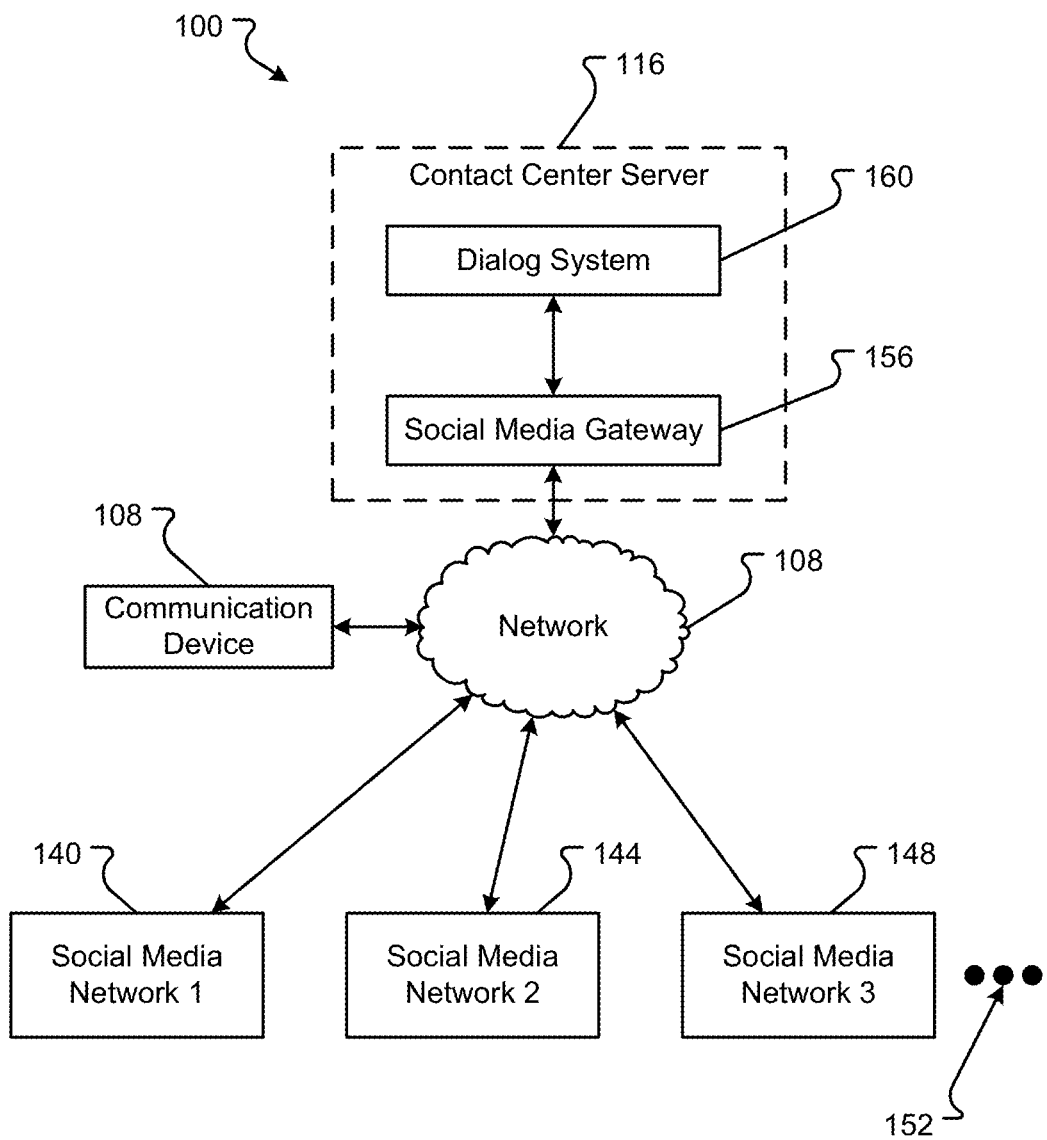
FIG. 1B is a block diagram of an embodiment of a communication system operable to interact with persons using a social media network.

A further embodiment of the communication system 100, for interacting with persons using social media, is shown in FIG. 1B. The communication system 100 can include a contact center 104, a network 128, 112, and one or more types of social media networks or systems, such as social media network 1 140, social media network 2 144, and/or social media network 3 148. Social media networks 140, 144, and/or 148 can be any social media including, but not limited to, networks, websites, or computer enabled systems. For example, a social media network may be MySpace™, Facebook™, Twitter™, Linked-In™, Spoke™, Sina Weibo, Pantip, or other similar computer enabled systems or websites. The communication system 100 can communicate with more or fewer social media networks 140, 144, and/or 148 than those shown FIG. 1B, as represented by ellipses 152.

The network(s) 128, 112 can be any network, as described in conjunction with FIG. 1A, which allow communication between the contact center 116 and the one or more social media networks 140, 144, and/or 148. The network(s) 128, 112 can represent any communication system, whether wired or wireless, using any protocol and/or format. The network(s) 128, 112 provides communication capability for the contact center 116 to communicate with websites or systems corresponding to the one or more social media networks 140, 144, and/or 148. The network(s) 128, 112 may be as described in conjunction with FIGS. 7 and 8.

A contact center 116 can be a system that can communicate with one or more persons that use social media networking sites 112, 114, and/or 116. The contact center 116 can be hardware, software, or a combination of hardware and software. The contact center 116 can be executed by one or more servers or computer systems, as described in conjunction with FIGS. 7 and 8. The contact center 116 can include all systems, whether hardware or software, that allow the contact center 116 to receive, service, and respond to directed and non-directed contacts. For example, the contact center 116 can include the telephone or email system, an interface to human agents, systems to allow human agents to service and respond to received contacts, and one or more systems operable to analyze and improve the function of agent interaction.

The contact center 116 may include a dialog system 160 and a social media gateway 156. While the dialog system 160 and the social media gateway 156 are shown as being a part of the contact center system 116, in other situations, the dialog system 160 and/or the social media gateway 156 are separate systems or functions executed separately from the contact center 116 and/or executed by a third party. The dialog system 160 may process and receive messages. The social media gateway 156 can receive and translate messages from the one or more social media networks 140, 144, and/or 148. An embodiment of the dialog system 160 is described in conjunction with FIG. 2B. An embodiment of the social media gateway 156 is described in conjunction with FIG. 2A.

The contact center 116 may also communicate with one or more communication devices 108. The communication devices 108 can represent a customer's or user's cell phone, email system, personal digital assistant, laptop computer, or other device that allows the contact center 116 to interact with the customer. The contact center 116 can modify a non-direct contact, from a social media network 140, 144, and/or 148, into a directed contact by sending a response message directly to a customer's communication device 108.

Figure 2A:
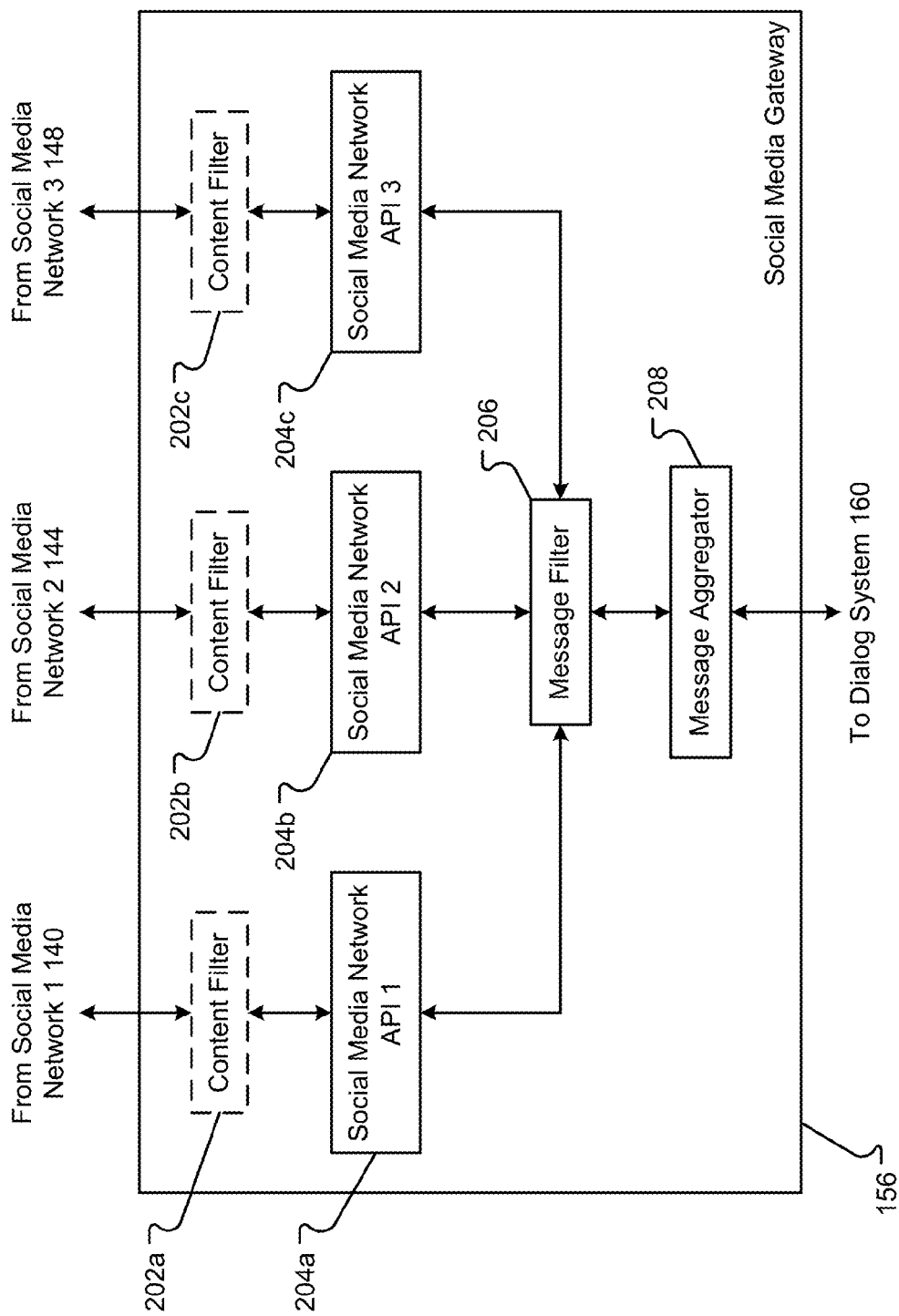
FIG. 2A is a block diagram of an embodiment of a social media gateway.

An embodiment of the social media gateway 156 is shown in FIG. 2A. The social media gateway 156 can include one or more components which may include hardware, software, or combination of hardware and software. The social media gateway 156 can be executed by a computer system, such as those described in conjunction with FIGS. 7 and 8. However, in other embodiments, the components described in conjunction with FIG. 2A are logic circuits or other specially-designed hardware that are embodied in a field programmable gate array (FPGA) application specific integrated circuit (ASIC), or other hardware.

Herein, the social media gateway 156 can include one or more content filters 202a, 202b, and/or 202c. A content filter 202 can receive all of the messages for the contact center 116 from a social media network 140, 144, and/or 148 and eliminate or delete those messages that do not require a response. For example, a message between two friends on a Facebook™ page, if not pertaining to a product or a service of the company operating the contact center 116, may not need a response. As such, the content filter 202 can filter out or delete the non-suitable message from the messages that are received by the social media network application programming interface (API) 1 204a, social media network API 2 204b, and/or social media network API 3 204c. With the content filter 202, the social media network API 204 only needs to convert to a common message format for those messages that should be received by the dialog system 160.

As an alternative or in conjunction with the embodiments described herein, the content filter 202 can translate or detect the use of the "latin" characters from the UNICODE Halfwidth and Fullwidth Forms block (e.g., the Cyrillic character represented by 'а' in the Unicode character set appears identical to the Latin letter 'a'). By substituting standard Latin characters for characters in the Halfwidth and Fullwidth Forms block (or similar), the poster may be seeking to defeat a string comparison or a regular expression matching method that may detect target words and/or phrases. To combat this type of character set spoofing, the content filter 202 can translate all the characters from the Halfwidth and Fullwidth Forms block (or similar) into a standard Latin representation before processing the message. Alternatively or additionally, the content filter 202 can "flag" (i.e., save an indication with the message of the translation or presence of the Halfwidth and Fullwidth Forms block) the message. The flag may be later used to determine if the posting is a troll post. The presence of Halfwidth and Fullwidth Forms block characters (or similar) may not always indicate that the message is a troll post because there may be cases where a non-native English user is legitimately attempting to create a message and uses a mix of standard Latin characters and characters from their language range. The translation or flagging of the message may also assist in evaluating the similarity of user names when someone is trying to spoof the detection by using alternative Latin characters in the creation of their username.

The content filter 202 is provided with one or more heuristics or filter rules from a filter database (not shown). These filter rules can be created by the external customer or internal user (e.g. agent or administrator) of the communication system 100. Thus, the user or customer of the communication system 100 can customize the filtering of messages from social media networks 140, 144, and/or 148. Further, different rules may be applied to different social media networks 140, 144, and/or 148, as some social media networks 140, 144, and/or 148 may have different types of messages or postings than other types of social media networks 140, 144, and/or 148. While the content filter 202 is shown as part of the social media gateway 156, it is to be appreciated that the content filter 202 may be a part of the social media network API 204. The content filter 202 may correspond to query terms used by the social media network API 204. The content filter 202 or query terms are an argument to the social media network API 204 call.

The social media network API 204 can be an application, which may be provided by the social media network 140, 144, and/or 148, to access the social media network(s) 140, 144, and/or 148. Thus, the social media network API 204 is called and connects the social media gateway 156 to the social media network 140, 144, and/or 148. Any suitable filter criteria may be employed for social media API 204. Examples of filter criteria include positive content of the source of a posting, an address field, a destination or recipient address fields, a time stamp field, a subject matter field, and/or a message body field. For example, a type of searchable content can be the name of the business enterprise running or employing the contact center 116 and/or the products or services of the enterprise.

The social media gateway 156 can include one or more social media network APIs 204. As shown in FIG. 2A, the social media gateway 156 may include a social media network API 204 for each social media network 140, 144, and/or 148. As such, the social media gateway 156 can interact with each social media network 140, 144, and/or 148 in the particular (often unique) format or protocol used by the social media network 140, 144, and/or 148. Further, when new social media networks are created, the social media gateway 156 can be easily expanded to interact with those social media networks by adding another social media network API 204. Where social media networks 140, 144, and/or 148 are more standardized, or use substantially similar formats or protocols, a single social media network API 204 can be shared by multiple social media networks 140, 144, and/or 148.

The social media network API 204 can receive messages from and send messages to the social media network 140, 144, and/or 148. The social media network API 204 can translate a message received from a social media network 140, 144, and/or 148 and send the translated message to a message filter 206. The social media network API 204 can translate the received message into a standard formatted file. For example, the translated message may be represented by an extensible mark-up language (XML) file or other file having a general format. As such, each specific and particular social media network message can be translated into a standard format for use by the dialog system 160. Further, the social media network API 204 can receive a generally or standard format response message, from the dialog system 160, and translate that response into a particularly or specifically formatted response message that can be posted to the corresponding social media network 140, 144, and/or 148.

Messages to the contact center 116 are addressed to the contact center 116. For example, a customer may become a "friend" of the contact center 116 on a social media network 140, 144, and/or 148, such as Facebook™. The customer may then address a message to the contact center 116 on Facebook™. This non-direct contact is a message that is not sent directly to the contact center 116 but to the contact center's Facebook™ page. In other circumstances, the contact center 116 receives messages not addressed to the contact center 116. For example, the contact center 116 can receive tweets from Twitter™ that are "broadcast" rather than addressed to the contact center 116. The contact center 116 may also search for messages or content on the social media networks 140, 144, and/or 148. Exemplary search criteria include customer name, customer profession, customer home address, customer business address, customer employer name, customer educational or professional background, customer hobby, personal or business interests, customer family profile, and the like. Thus, the social media gateway 156 of the contact center 116 can query, gather, or connect to a live feed of data from a social media network 140, 144, and/or 148 and then apply a filter to the indirect information.

Further, the social media network API 204 can also retrieve user context or other extended information from the social media networks 140, 144, and/or 148. User context or other extended information can include historical posts, historical tweets, or other historical communications that a user may have received or sent. Further, user context or other extended information can include, but is not limited to, account information for a user, the user's followers or friends, information on where historical messages were posted (e.g., geo-location, time/date, what type of device, etc.), trending analysis that the social media network 140, 144, and/or 148 might provide the user, etc. Thus, the social media network API 204 can retrieve information that is associated with a user and a social media network 140, 144, and/or 148 but not necessarily a part of a current message. The social media network API 204 is a gatherer of data, which can be used to determine a value for the user of the social media networks 140, 144, and/or 148.

The translated messages from the social media network API 204 can be received by a message filter 206. A message filter 206 can perform some or all of the functions of the content filter 202 and eliminate messages before being sent to the dialog system 160. However, in other situations, the message filter 206 eliminates information from within the messages before the redacted messages are sent to the dialog system 160. For example, a message from a social media network 140, 144, and/or 148 may have three or four interactions between two parties not associated with the contact center 116. Only one of the several postings may be pertinent to the dialog system 160. As such, the message filter 206 can eliminate or delete at least a portion of the other messages for the dialog system 160. Thus, the dialog system 160 receives a message where some of the content of the message has been deleted.

The message filter 206 can retrieve heuristics or filter rules from a filter database (not shown), similar to the content filter 202. A substantial difference between the content and message filters 202 and 206 is that the content filter 202 is specific to a particular message format associated with a corresponding social media network 140, 144, and/or 148, while the message filter 206 is applied to a standardized or universal format and is therefore common to multiple social media networks 140, 144, and/or 148. One skilled in the art will understand the type of rules that may be used to filter information from messages such that only pertinent questions, facts, requests, or information is sent to the dialog system 160.

A message aggregator 208 may also be included with the social media gateway 156. A message aggregator 208 can, in contrast to the message filter 206, combine two or more messages into a packet or grouping that is sent to the dialog system 160. Therefore, the message aggregator 208 can interrelate or combine messages based on information within the messages. For example, two messages may be combined based on any of the message fields referenced above, such as the person that posted the message, the subject, the request or question asked, the person the message was sent to, or other information that may be pertinent to the dialog system 160. Thus, the dialog system 160 may be able to respond concurrently to two or more messages based on a grouping provided by the message aggregator 208. Regardless of whether the messages are aggregated, each message or grouping of messages can be sent from the social media gateway 156 to the dialog system 160.

The social media gateway 156 can also send responses back to the social media networks 140, 144, and/or 148. A response from an agent in the contact center 116 can be sent to the social media gateway 156. The response may be received in a general format and then translated. The translated response may then be posted to the appropriate social media network 140, 144, and/or 148 by the social media gateway 156. In other embodiments, the agent may post the response directly to the social media network 140, 144, and/or 148 without sending the response to the social media gateway 156.

Figure 2B:
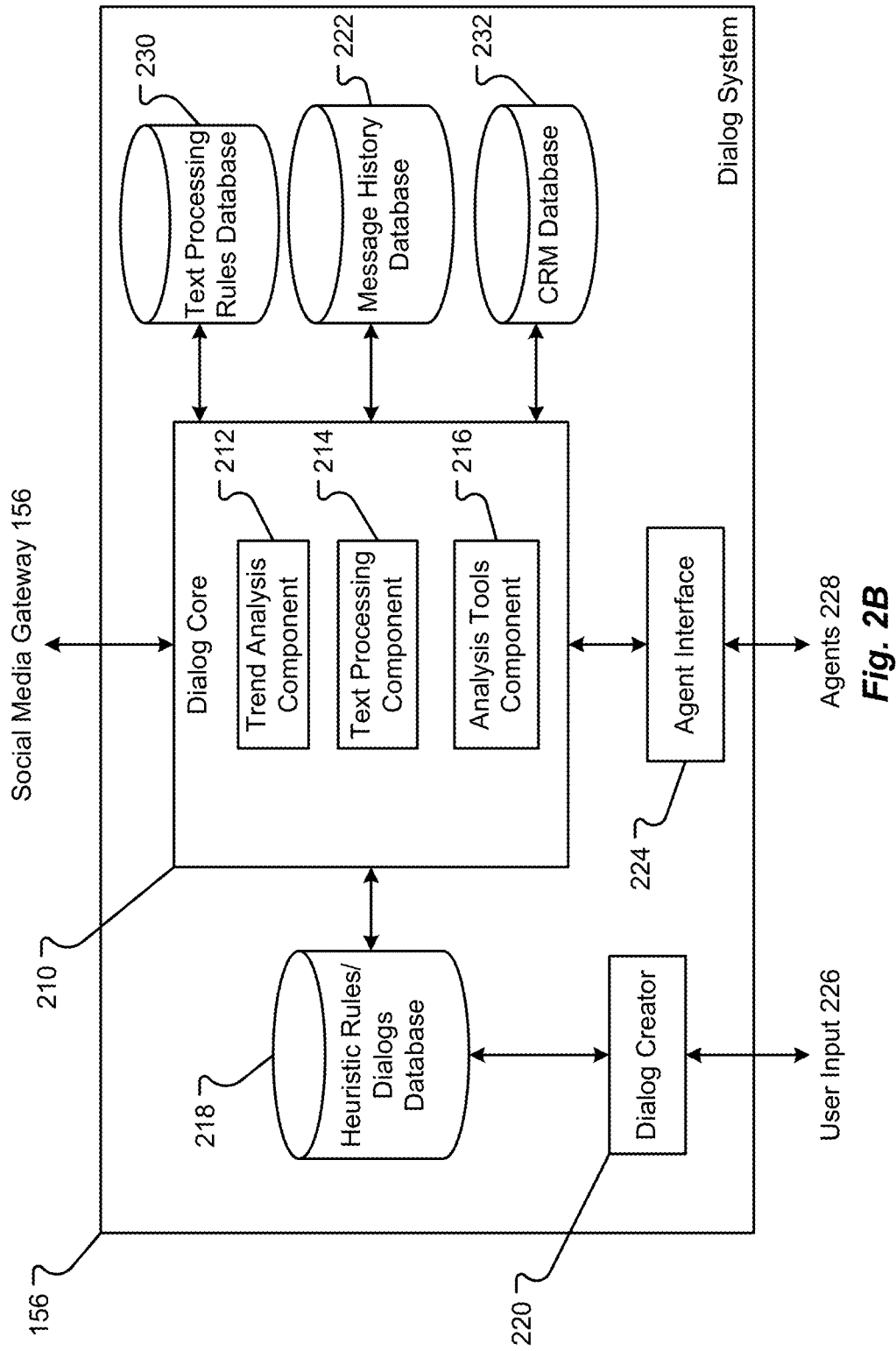
FIG. 2B is a block diagram of an embodiment of a dialog system.

An embodiment of the dialog system 160 is shown in FIG. 2B. The dialog system 160 can include one or more components which may be hardware, software, or a combination of hardware and software. The dialog system 160 can be executed by a computer system such as those described in conjunction with FIGS. 7 and 8. However, in other embodiments, the components described in conjunction with FIG. 2B, are logic circuits or other specially-designed hardware that are embodied in a FPGA or ASIC. The components contained within the dialog system 160 can include a dialog core 210 that is communication with a message history database 222, an agent interface 224, and a heuristic rules and dialogs database 218. Further, the heuristic rules and dialogs database 218 can be in communication with a dialog creator 220.

The dialog core 210 can include one or more sub-components. For example, the dialog core 210 can include a trend analysis component 212, a text processing component 214, and an analysis tools component 216. These components, similar to the components for the dialog system 160, can be hardware, software, or combination of hardware and software. The dialog core 210 may step through the states of a dialog data structure. A dialog data structure can include a set of inputs and associated actions that can be taken which allow for the automatic and structured response to social media requests or messages. For example, if a user asks for a manual, the input of the text word "manual" can cause the dialog system 160, in accordance with a dialog data structure, to send information about one or more manuals. In turn, the receiver of the response may respond, in kind, with the selection of a certain user manual. In which case, the dialog data structure may then instruct the dialog core 210 to send the user to a website where the user can retrieve an electronic version of the manual. As such, the dialog data structure provides a script a dialog that allows the dialog core 210 to automate the interaction between the contact center 116 and a person. This automation eliminates the need for agent involvement, in some situations, and makes the contact center 116 more efficient and more effective. Further, the automation expands the contact center's ability to answer numerous messages from the plethora of postings on the numerous social media networks 140, 144, and/or 148.

The dialog creator 220 can create a dialog data structure that includes instructions for various states for each social media message that comes into the contact center 116. The first instruction might be to send the social media message to the trend analysis component 212, then to the text processing component 214, and then execute a query of a Customer Relationship Management (CRM) database 232 (to determine if this user has an existing order). A CRM database 232 can be a database as described in conjunction with FIGS. 7 and 8 and can store information about customers or other data related to customer relations. Finally, the dialog data structure 220 may decide that the social media message should be sent to a human agent 228 for processing. The instructions or node transitions are executed in the dialog core 210 and make use of many different components that the dialog creator 220 combines in any way the user desires to handle the social media messages. The dialog core 210 can make use of the trend analysis component 212, text processing component 214, or other systems.

The dialog core 210 may also interface with a CRM system and/or database 232, external databases, social media user information (e.g., followers, friends, post history, etc. from the social media site), or other systems.

The trend analysis component 212 is operable to analyze trends that occur between two or more messages received by the social media networks 140, 144, and/or 148. The two messages can be from different social media network 140, 144, and/or 148, so that the trend analysis component 212 can identify trends across several different social media networks 140, 144, and/or 148. Trends can include multiple occurrences of the same word or phrase, multiple occurrences of a customer identity, product name or service, or multiple occurrences of some other information that might indicate a trend. Further, the trend analysis component 212 may be able to identify escalations in the occurrences of particular text, identities, or other information, or may identify multiple occurrences over a period of time. The trend analysis component 212 may also be able to apply one or more different algorithms to occurrences of information within the social media networks 140, 144, and/or 148. For example, the trend analysis component 212 can match the number of occurrences of a phrase or word over a period of time and apply analysis to determine if the occurrences are increasing or decreasing over the period of time.

The text processing component 214 is operable to analyze text of one or more messages from social media networks 112, 114, or 116 or other contacts. Some possible methods for text processing can include Regular Expression, Latent Semantic Indexing (LSI), text part of speech tagging, text clustering, N-Gram document analysis, etc. In addition, for possibly longer documents, (such as, blogs or emails), the text processing component 214 may execute one or more methods of document summarization. The summarization may occur if the social media message will be sent to an agent 228 of the contact center 116; the summarization can reduce the amount of information that the agent 228 may manage. The text processing rules or models may be stored in and/or retrieved from a text processing rules database 230. The text processing rules database 230 can be a database as described in conjunction with FIGS. 7 and 8 that stores rules or models used by the text processing component 214.

The text processing component 214 can identify one or more occurrences of a particular text, such as using one or more of the message fields referenced above, in order to associate that social media message with one or more dialogs data structures in the heuristic rules and dialog database 218. For example, the text processing component 214 can look for the word "manual," in the social media message. If the word "manual" is found, the text processing component 214 may retrieve a dialog data structure from the heuristic rules and dialogs database 218 and, as the dialog data structure instructs, communicate with the customer about one or more owner's manuals, repair manuals, or other types of manuals. In another example, if the social media message includes the words, "buy", "sell", "price, "discount" or other types of words that may indicate the user or customer wishes to buy a product, the text processing component 214 can retrieve one or more dialog data structures from the heuristic rules and dialogs database 218 that can provide instruction to assist the customer in purchasing products or services from the enterprise.

The analysis tools component 216 is operable to analyze response messages received back from an agent interface 224. In analyzing the agent's responses, the analysis tools component 216 can determine if the dialog data structures originally retrieved by the text processing component 214 met the needs of the customer. In the analysis, the agent 228 may enter one or more items of information, for the analysis tools component 216, about the response and about how the response matched with the dialog data structures. The analysis tools component 216 can review the response and determine if it was similar to the response provided by the dialog data structure. Thus, the analysis tools component 216 can provide information to the dialog core 210 or the dialog creator 220 to improve the dialog data structures that are included in the heuristic rules and dialogs database 218.

Figure 7:
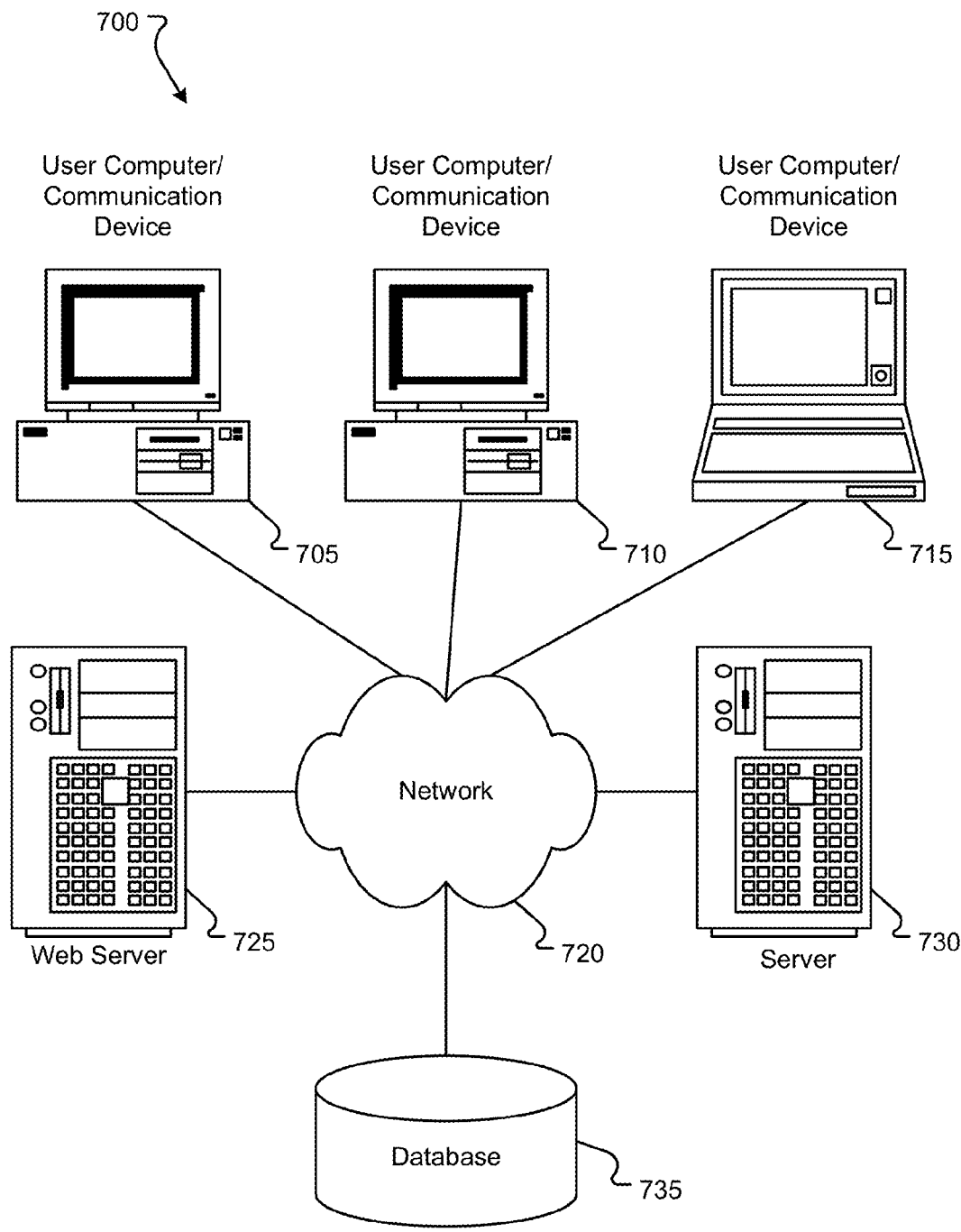
FIG. 7 is a block diagram of an embodiment of a computing environment.
Figure 8:
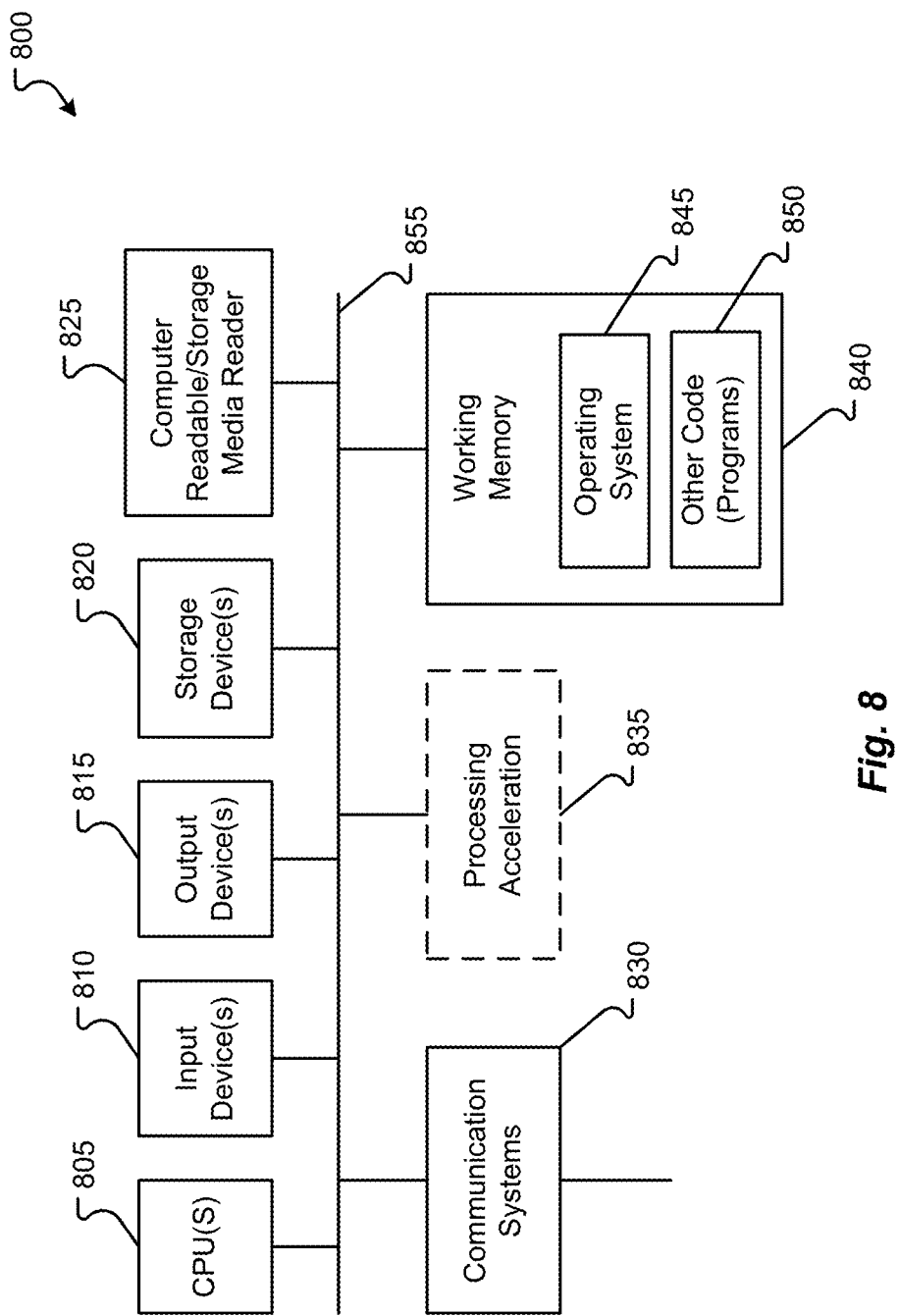
FIG. 8 is a block diagram of an embodiment of a computer system.

The message history database 222 can be any database or data storage system as described in conjunction with FIGS. 7 and 8. Thus, the message history database 222 can store data in data fields, objects, or other data structures to allow other systems to retrieve that information at a later time. The message history database 222 can store previous messages or information about previous messages. Thus, for example, if the trend analysis component 212 is analyzing several messages over a period of time, the trend analysis component 212 can retrieve information about previous messages associated with the current analysis from the message history database 222. As such, the trend analysis component 212 can better detect trends occurring at the social media networks 140, 144, and/or 148. The data stored by the message history database 222 can include the entire message or only a portion of the message, and in some circumstances, include metadata about the message(s).

The heuristic rules and dialogs database 218 can be any type of database or data storage system as described in conjunction with FIGS. 7 and 8. The heuristic rules and dialogs database 218 can store information in data fields, data objects, and/or any other data structures. The heuristic rules and dialogs database 218 stores rules and dialogs data structures that automate responses to received social media messages. The dialogs data structures control the interaction between the dialog core 210 and the social media network 140, 144, and/or 148. The dialogs or heuristic rules can be created by a dialog creator 220. Thus, the dialog creator 220 can interface with user input 226 to receive information about dialogs. The user input 226 is then used to form the states and responses for a dialog data structure.

An agent interface 224 is a communication system operable to send action items to contact center agents 228, in the contact center 116. An agent can be a person or other system that is operable to respond to certain questions or requests from a customer. For example, the agent 228 can be a person that has specialized expertise in a topic area, such as technical support. The agent interface 224 can format the social message into an action item and forward that message to one or more agents 228. The agent interface 224 can also receive response(s) back from the agents 228. The information provided by the agent 228 may be used by the dialog core 210 to complete a response to the social media message or other contact. For example, the information may classify the social media message (e.g., sales, service, etc.). In other situations, the response is a complete response to the social media message that can be posted to the social media network 140, 144, and/or 148. It should be noted that the answer based agent routing described hereinafter may be implemented in other types of call center or customer service centers other than that previously described. Thus, the answer based agent routing systems and methods described hereinafter are not limited to the social media call center described above.

Figure 3A:
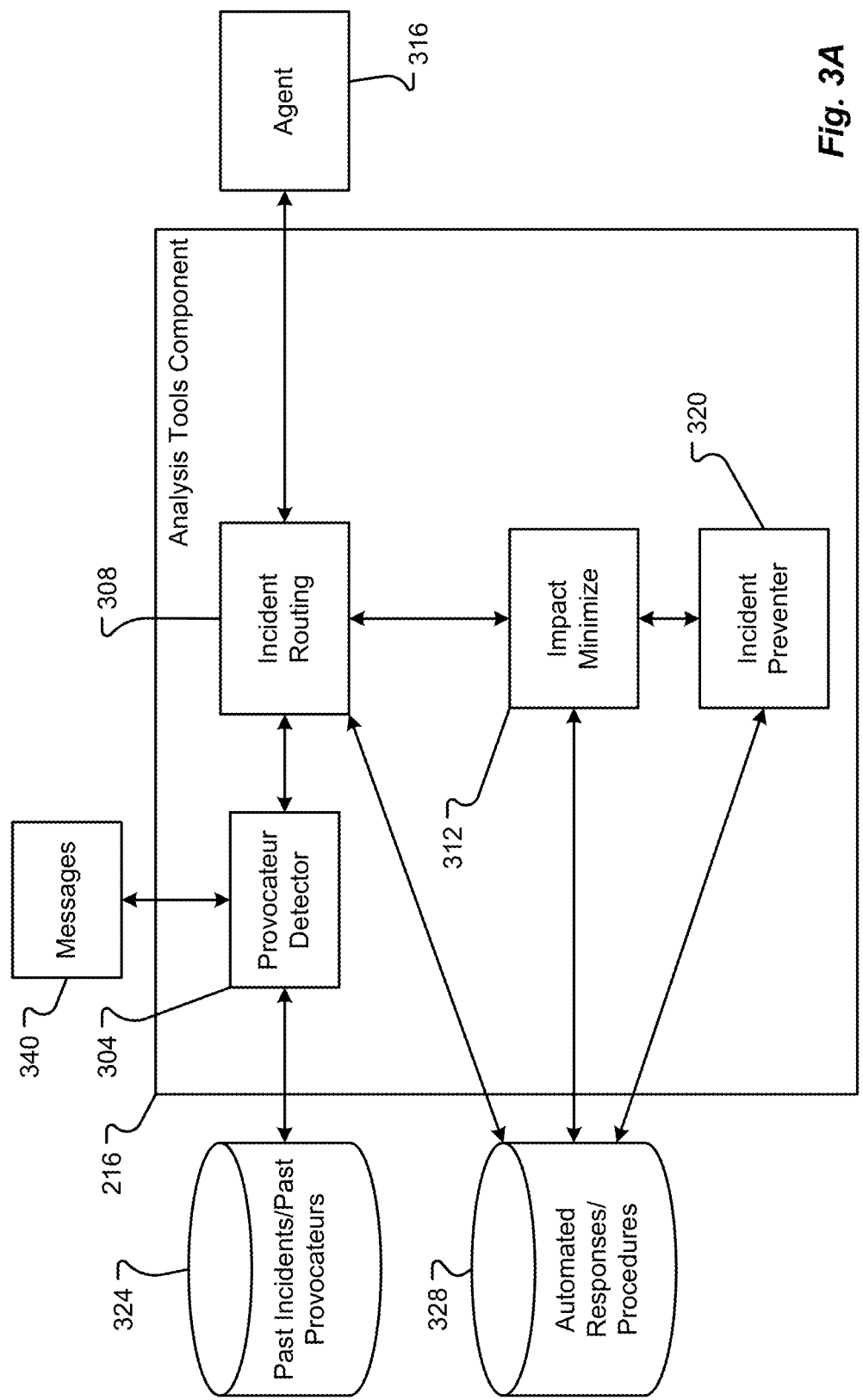
FIG. 3A is a block diagram of an embodiment of an analysis tools component.

An embodiment of an analysis tools component 216 is shown in FIG. 3A. The analysis tools component 216 can include one or more modules that perform different functions. These modules may be embodied in hardware, software, and/or hardware and software. The analysis tools component 216 can include a provocateur detector 304, an incident routing module 308, an impact minimizer 312, and/or an incident preventer 320. These modules 304-320 may communicate, retrieve, store, and/or manage data in one or more databases. For example, the modules 304-320 may communicate with a past incidence past provocateurs database 324 and/or an automated responses database 328.

The provocateur detector 304 can detect provocateurs or incidences of provocateur involvement in social media message(s) 340. Thus, the messages 340 may be one or more social media messages or other types of messages received by the analysis tools component 216. The provocateur detector 304 may analyze the messages 340, along with, or compared to, past incidence and past provocateurs data in database 324 to determine if a provocateur is involved in one or more messages 340. An embodiment of the provocateur detector 304 is explained in conjunction with FIG. 3B. If there is a detection of a provocateur or a detection of nefarious conduct involved in a message 340, the provocateur detector 304 can route the message or messages 340 to the incident routing module 308.

Incident routing module 308 may access automated responses and procedures database 320 to determine an appropriate response to the detected involvement of a provocateur. The incident routing module 304 may route the message to a specially trained agent 316 to react to the provocateur. Alternatively or in combination with the embodiments described herein, the incident routing module 304 can generate an automatic response to the message or conduct some other automated procedure that may mitigate or obviate the provocateur's involvement. Alternatively or in combination with the embodiments described herein, the incident routing module 308 can pass the message or messages 340 to the impact minimizer 312.

The impact minimizer module 312 may also access automated responses procedures database 328 to retrieve a minimization procedure. Minimizing the impact of a provocateur or nefarious conduct may include, but is not limited to, eliminating comments to a social media posting, providing an automated message to a social media site to eliminate the provocateur from posting comments, shutting down one or more websites or accounts, or other types of responses. The impact minimizer 312 may, therefore, try to automatically minimize any kind of harm that may be done by a detected provocateur. Alternatively or in combination with the embodiments described herein, the incident messages 340 may be passed from the impact minimizer to the incident preventer module 320.

The incident preventer module 320 may conduct procedures to prevent any type of future or ongoing impact by the detected provocateur. The incident preventer 320 can register or store information about the provocateur such that when that provocateur appears on a future posting, the incident preventer 320 may conduct automatic functions to prevent any type of harm without having to first detect that provocateur. The automated prevention 320 allows the system to become more effective and robust as different incidences involving provocateurs are first detected and responded to.

Alternatively or in combination with the embodiments described herein, the messages 340 may be passed by one or more modules 304-320 to a trained agent 316 per the guidance of the incident routing module 308. The agent 316 may be a specially trained agent that can respond specifically to such incidences involving social media provocateurs. It should be noted that incident routing module 308, impact minimization module 312, and incident preventer module 320 may function together or may be alternatives and, thus, the analysis tools component 216 may only include one of these modules. The automated responses and procedures database 328 can include one or more automated responses or procedures for use by the incident routing module 308, impact minimizer module 312, and/or incident preventer module 320.

Figure 3B:
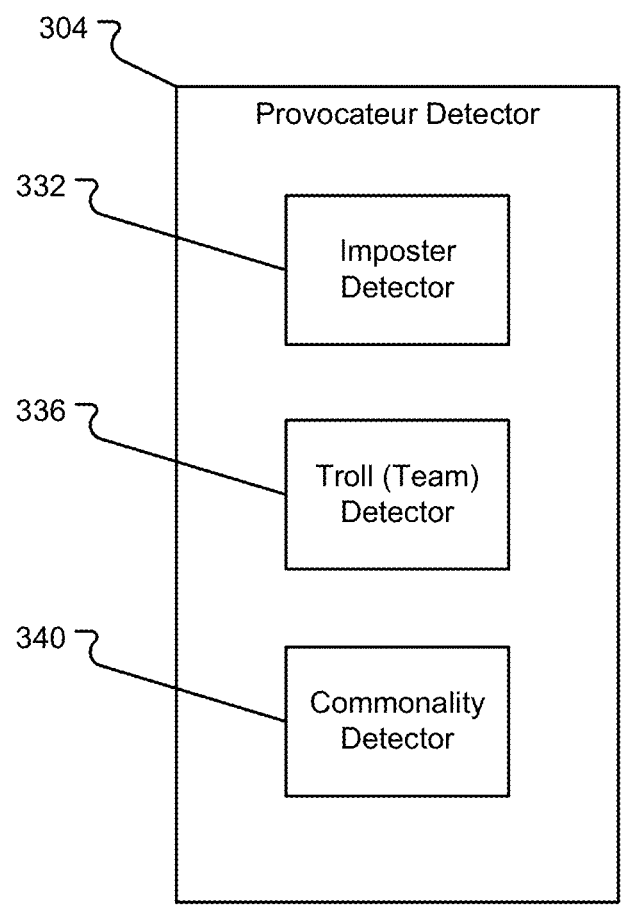
FIG. 3B is a block diagram of an embodiment of a provocateur detector module.

An embodiment of a provocateur detector module 304 is shown in FIG. 3B. The provocateur detector 304 may include one or more sub-modules which can include, but is not limited to, an imposter detector 332, a troll or team detector 336, and/or a commonality detector 340. There may be more detectors associated with the provocateur detector 304, which are not shown in FIG. 3B.

An example of one of the detectors, the imposter detector 332, can determine a certain type of provocateur. With the imposter detector 332, the messages 340 are scanned to determine if a posting was made by a person posing or impersonating someone involved with the organization. For example, someone may ask a question about an airline. A provocateur may appear to be an employee of the airline based on some indicia provided to the person asking the question. This impostor may post a response or some information in response to or in relation to the question asked. However, the posting may not be from the organization and may include information that angers or disturbs the person asking the question.

Thus, the imposter detector 332 can determine, based on information collected or stored with the organization, whether any posting was made by the organization. If a posting was made by the organization, but the response was made at a different time or by a different person, the imposter may be detected. In other examples, if no posting has been made by the organization, the imposter detector 332 can determine that the response or posting that appears to be from the organization is from a provocateur. Thus, the imposter detector 332 can detect incongruencies between a response made on a social media site and any messages generated by the organization. The incongruencies, including any information about the impostor, may be stored in the past incidence/past provocateurs database 324. Further, the incongruencies and provocateur detection may then be passed onto the incident routing module 308 by the imposter detector 332.

A team or troll detector 336 can determine if a team of responders appears to be working together or in collaboration. The troll detector 336 can monitor negative postings that appear to be derogatory. The social media identifiers or other identifying information about the posters may be stored. If another set of postings is made that appear to be from the same group that are also derogatory, the troll detector 336 can determine that the group of posters are working together to cause problems on the social media site. This team may then be determined to be part of the same provocateur team, and their information, and any of the messages 340, may be passed to the incident routing module 308.

The commonality detector 340 may analyze and store information about derogatory and negative postings in a past incidence/past provocateurs database 324. Any common words, phrases, or unique attributes of one message 340 may be compared to past messages. If there is a likeness between the phraseology, the words used, or other characteristics of the messages 340, the commonality detector 340 may associate the social media identifiers (IDs) or/and the messages 340 of the provocateur's posting as associated messages. In this way, the commonality detector 340 may identify provocateurs regardless of whether those provocateurs are using numerous different IDs on the same social media site. Further, the commonality detector 340 may also identify provocateurs across different social media sites based on the provocateurs' use of language or other attributes of the postings 340.

In addition or in the alternative, the commonality detector can examine messages using similarity metrics (e.g., Cosine Similarity or the equivalent) to detect similarity in the entire message content. This message analysis can detect the cases where the poster is repeatedly posting the same or nearly the same message using one or more identities and/or across one or more media channels.

Figure 4:
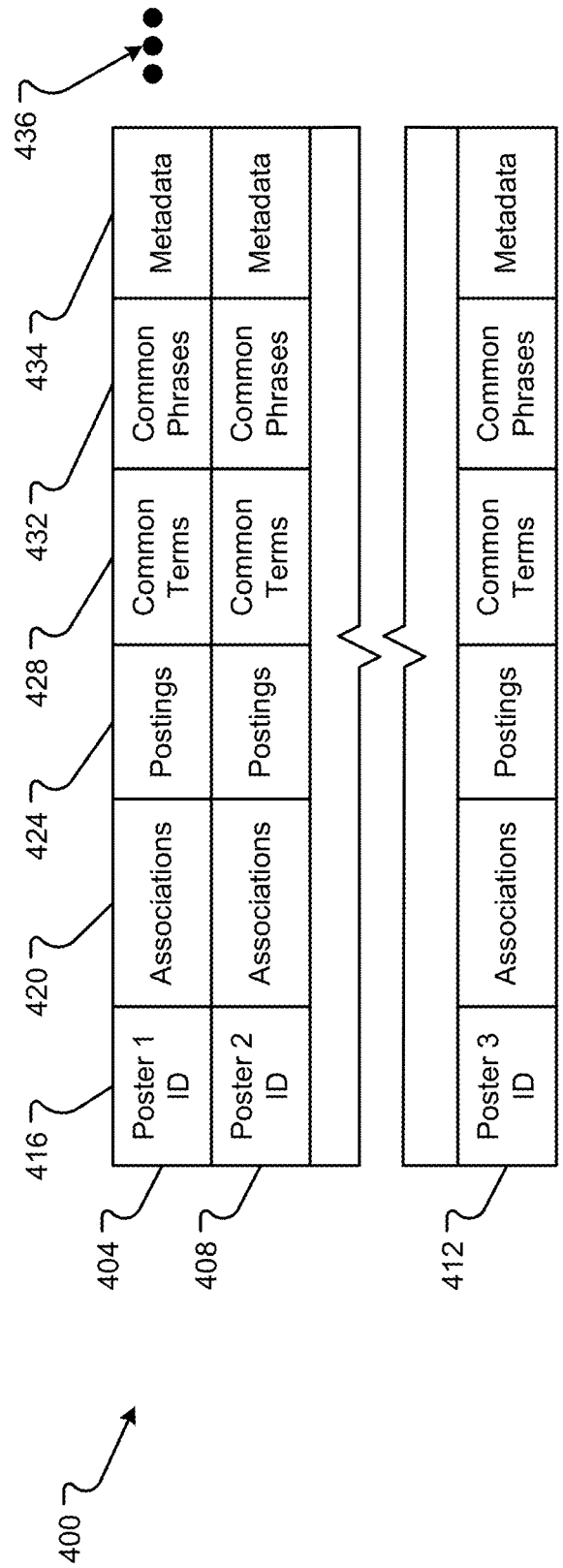
FIG. 4 is a block diagram of an embodiment a data structure or database for storing provocateur information.

A database 400 for storing information about social media provocateurs, which may be the same or similar to negative/positive terms database 324, is shown in FIG. 4. The database 400 can include one or more rows 404-412 which can include data about a social media poster or possible provocateur. Each row may be information about a single provocateur. Alternatively, each provocateur may have two or more different rows 404-412 associated with their information. The rows may have one or more fields of data, which can include, but are not limited to, a poster identifier 416, an associations field 420, a postings field 424, a common terms field 428, and a common phrases field 432. The database 400 may include more or fewer fields than those shown in FIG. 4 as represented by ellipses 436.

A poster identifier (ID) 416 can be any identifier that uniquely identifies that poster of social media content. Thus, the poster identifier 416 can be a globally unique identifier (GUID), a numeric identifier, an alphanumeric identifier, etc. These poster IDs 416 may be provided for a poster after receiving a negative or derogatory posting associated with that poster. The poster ID 416 can also include the user name or information from a social media site that identifies the poster on that social media site. If the poster has several different IDs, those IDs may be consolidated into a single row 404-412 after determining the association between the different social media site user names or identifiers. Thus, one poster identifier 416 may be associated with several user names from different social media sites.

The associations field 420 can include any type of associations with other users or other user names of the poster. For example, if the poster is associated with a team of different users that are working together to post derogatory information on a social media site, the associations 420 may include the user names or posters IDs 416 from those other users. The associations 420 can be pointers or other links to the other team members. Further, or alternatively, the associations 420 may include the other user names used by this poster that are associated with the identifier 416.

The postings 424 may include either the text/content or links to stored content for this poster. Thus, the postings 424 include the raw data, or at least some form of data, about the social media postings. These postings allow for future analysis or response by agents once the agent receives the posting.

Common terms 428 can include one or more different words or writing style information used by the poster. These terms 428 can be used to identify the poster in future postings. Thus, the common terms, for example, may include different or interesting words used in postings that may be used to identify the poster as being the author of future postings. Common phrases 432, similar to the common terms 428, include phrases, writing style information, or other information that can also identify the poster 416. Between the common terms and common phrases 428, 432, the system may be able to identify a poster's writing style, identify that poster in future postings, and associate those different messages with past messages stored in postings 424.

Metadata 434 includes an information, beyond the content of postings, that describes or characterizes a social media posting, a poster, a poster's account, etc. The metadata 434 is, in general, information about information. Thus, the metadata 434 can include the data or time when a posting was made, the amount of data in a posting, from where the posting was made, etc. Further, the metadata 434 can include information about a poster's activity level, the poster's friends or connections with other posters, a poster's nickname, etc. Still further, the metadata 34 can include information about a poster's account, for example, the date the account was created, the biographical data associated with the account, the activity on the account, etc. The metadata 434 may also be analyzed to identify social media provocateurs.

Figure 5:
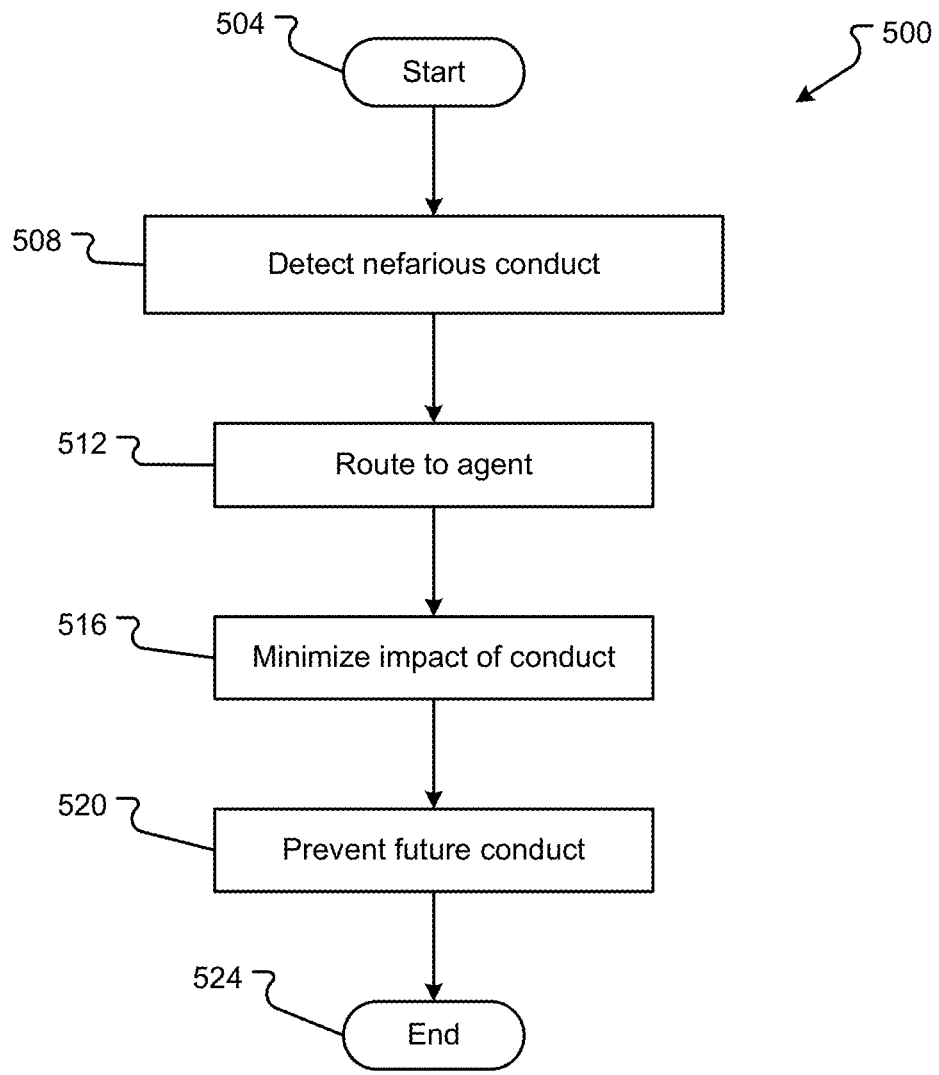
FIG. 5 is a flow diagram of an embodiment a process for responding to social media provocateurs.

An embodiment of a method 500 for responding to social media provocateurs is shown in FIG. 5. Generally, the method 500 begins with a start operation 504 and terminates with an end operation 524. While a general order for the steps of the method 500 are shown in FIG. 5, the method 500 can include more or fewer steps or arrange the order of the steps differently than those shown in FIG. 5. The method 500 can be executed as a set of computer-executable instructions, executed by a computer system, and encoded or stored on a computer readable medium. Further, the method 500 can be executed by a gate or other hardware device or component in an Application Specific Integrated Circuit, a Field Programmable Gate Array, or other type of hardware device. Hereinafter, the method 500 shall be explained with reference to the systems, components, modules, software, data structures, user interfaces, etc. described herein.

The contact center server 116 can receive messages 340. The messages 340 may be social media messages that are received through a social media gateway 156 and provided to the dialog system 160. The dialog core 210 of the dialog system 160 may then process the messages. The messages may be sent to the provocateur detector 304 of the analysis tool component 216. The provocateur detector 304 may then detect nefarious conduct, in step 508, for the set of messages received from the social media networks 140 through 148. Thus, the provocateur detector 304 may process the message with the imposter detector 332, the troll detector 336, the commonality detector 340, and/or one or more other modules. An example of the detection of nefarious conduct may be as shown in method 600, described in conjunction with FIG. 6.

Upon detecting nefarious conduct from a social media provocateur, the provocateur detector 304 may send the message(s) 340 to the incident routing module 308 or another module 312-320. From there, the message(s) may be responded to or managed through one or more alternative steps. While the steps described herein may be alternative, they may also be done in concert or in combination with each other to provide a more effective response to the nefarious conduct.

The incident routing module 308 may access automated responses and procedures from database 328. One of the procedures may be to route the messages 340 to an agent 316, in step 512. Thus, the incident routing module 308 may identify an agent 316 and tag the messages or message with the agent information to be sent to the agent 316. The incident routing module 308 may then send the message to the agent 316 and/or pass the message to the impact minimizer module 312.

The impact minimizer module 312 may then minimize the impact of the conduct, in step 516. The impact minimizer 312 may access the automated responses and procedures database 328 to extract one or more procedures to address the nefarious conduct. These procedures may include, but are not limited to, sending an automated response that is associated with whichever social media site 144 through 148 to which the message was received. The response may target the provocateur(s) and request or direct some action to be taken. Thus, if social media site 140 allows for the blocking of content from a certain user, the impact minimizer 312 may block further content from that user on that string or on any posting associated with the organization on the social media network 140. Further, if another social media site 144 allows for the user to be reported or to be removed from the site, the impact minimizer 312 may automatically alert the social media site 144 of the nefarious conduct and the identifier for the provocateur who is responsible. The social media network 144 may then remove that provocateur from the site 144. Other minimization techniques may be allowed and provided in the step 516.

The impact minimizer module 312 may then send the message to the incident preventer module 320. The incident preventer module 320 may prevent future conduct, in step 520. Here, the incident preventer module 320 may also access the automated responses and procedures database 328 to extract procedures for preventing future nefarious conduct from the identified social media provocateurs. Similar to the impact minimizer module 312, the incident preventer module 320 may conduct different procedures based on the protocols of the social media networks 140 through 148.

For example, the incident preventer 320 may report the social media provocateur to a social media network 144, or to other social media networks 140, 148, to which the social media provocateur had yet to post. Thus, the incident preventer module 320 can prevent nefarious conduct by an identified social media provocateur at the site where the social media provocateur provides content, or other sites where it is known the social media provocateur has access. Thus, the incident preventer module 320 can prevent the conduct by a single provocateur, team of provocateurs on several social media networks 140 through 148 based on postings only in a single social media site. Further, the incident preventer 328 can remove content from other sites or can prohibit comments on content at other sites or at the current site. All these automated procedures may be done to limit the ability for a social media provocateur to post nefarious content. It is understood by one skilled in the art that there may be other procedures for preventing nefarious conduct by social media provocateurs that may be conducted by the incident preventer module 320.

Figure 6:
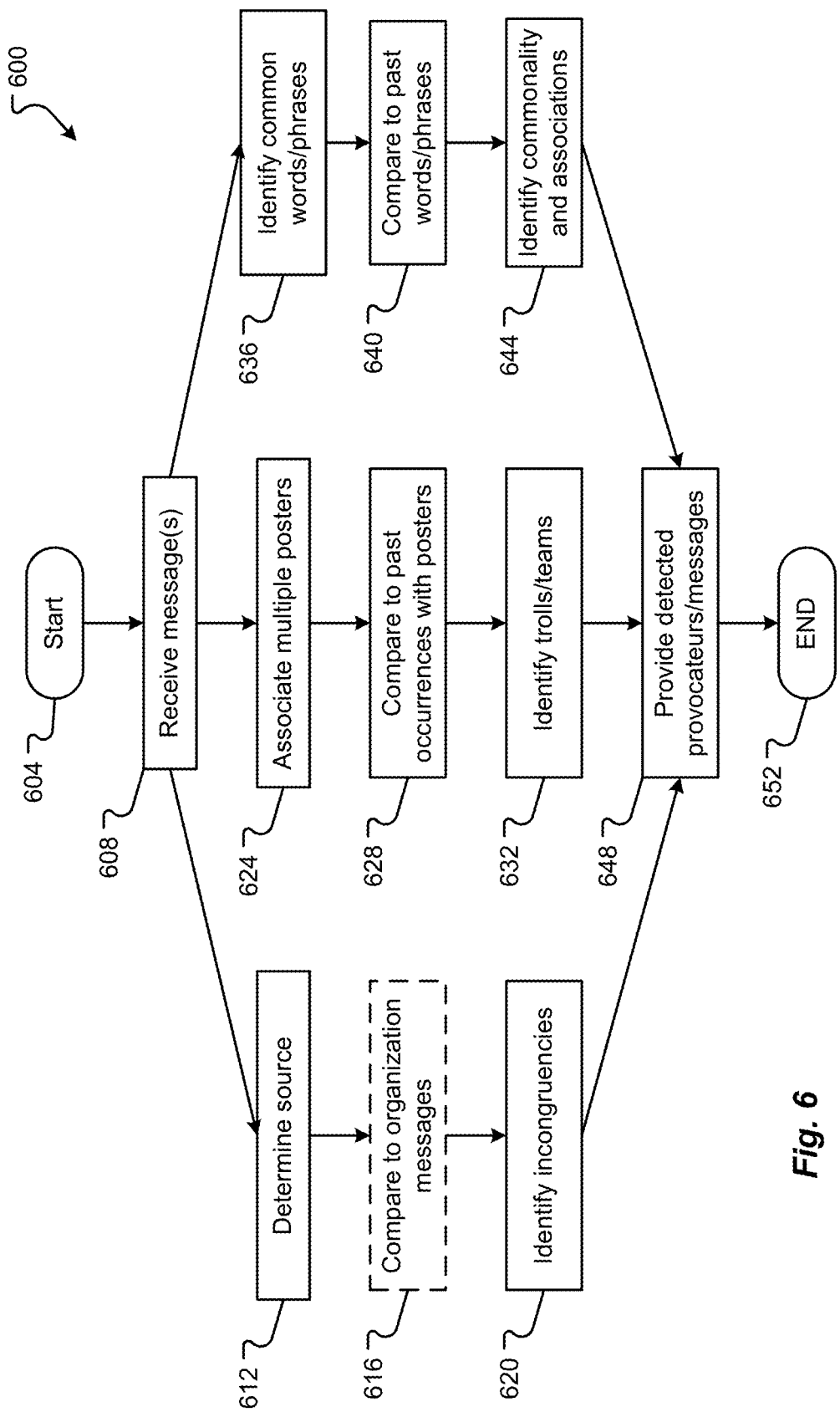
FIG. 6 is a flow diagram of an embodiment a process for identifying social media provocateurs.

An embodiment of a method 600 for identifying social media provocateurs is shown in FIG. 6. Generally, the method 600 begins with a start operation 604 and terminates with an end operation 652. While a general order for the steps of the method 600 are shown in FIG. 6, the method 600 can include more or fewer steps or arrange the order of the steps differently than those shown in FIG. 6. The method 600 can be executed as a set of computer-executable instructions, executed by a computer system, and encoded or stored on a computer readable medium. Further, the method 600 can be executed by a gate or other hardware device or component in an Application Specific Integrated Circuit, a Field Programmable Gate Array, or other type of hardware device. Hereinafter, the method 600 shall be explained with reference to the systems, components, modules, software, data structures, user interfaces, etc. described herein.

The provocateur detector 304 can receive messages, in step 608. The messages 340 may be received by the dialog core 210 of the dialog system 160 from one or more social media sites 140 through 148. The messages may be one or more social media messages obtained from one or more social media sites. The messages may be interrelated based on posters, timing, common themes, etc. The messages may then be provided to one or more of the modules of the provocateur detector 304.

In step 612, the imposter detector 332 determines the source of the one or more messages. The source may be the poster or include some information that is associated with a person or entity that posted the social media content. The source may also include any information that is stored within the past incidence or the past provocateurs database 324. For example, the source information may be associated with the poster ID 416 or associations 420.

The information in the source may then be compared to past organizational messages, step 616. Here, the imposter detector 332 may access past messages sent from the dialog system 156. For example, the message history database 222 may be accessed to determine which messages were sent by the dialog system 156. Those messages may have a source or agent and time or temporal information. This information may be compared to the source and other information associated with the received message 340.

If there is no message which seems to relate to a message sent in the message history database 222, the imposter detector 332 can identify those incongruencies, in step 620. In this way, if there is no message which appears to be sent or posted on a social media network 140 through 148 by the organization, the imposter detector 332 can flag that message as coming from an imposter posing as the organization on the social media site. This information may then be provided along with the information about the provocateur to the incident routing module 308, in step 648.

In the alternative or in conjunction with the embodiment above, the imposter detector 332 can also analyze any metadata 434 associated with the poster, the posted content, or the poster's account. Here, the imposter detector 332 can detect anomalies or oddities with the poster or posting. For example, if the poster's account is very new or has little activity, this information may alert the imposter detector 332 that the content is likely from a provocateur. In another example, if the team members are linked to the poster's account, this information may also indicate that the team is working together and are provocateurs. Metadata from the team members can also be analyzed. Thus, the imposter detector 332 can conduct a profile analysis that scrutinizes the poster for associations (e.g., are your friend's trolls, or your friends' friends trolls, etc.) and/or attributes of the poster's profile that may be suspicious (e.g., is the profile not filled, out completely, has few friends, was created yesterday, rarely posts, etc.). Other methods of completing profile analysis may be used as understood by one skilled in the art. These incongruencies may also be passed to an agent or other module.

The troll or team detector 336 can receive the messages and associate the multiple posters in several messages, in step 624. Here, based on the temporal proximity of messages posted on a social media site, the troll detector 336 can associate two or more posters as possibly working together. The identities of these different posters may be extracted, along with any information that may identify those posters.

The troll detector 336 may then scan the poster IDs 416 and associations 420 to determine if these posters have had a past association or collaboration in posting derogatory messages in social media sites. If there are past associations stored in field 420, the troll detector 336 can identify the trolls or team members by their identity, in step 632. Thus, the identities of the different trolls or team members and the messages may be sent to the incident routing module, in step 648.

The commonality detector 340 can receive messages and parse those messages to determine common words or phrases within those messages, in step 636. These common words or phrases may be extracted or identified through known language processing techniques. These common words or phrases may then be used to compare to the common terms 428 and/or common phrases 432, in the database 400, in step 640. Here, the commonality detector 340 tries to determine an identity of a poster based on that poster's past language usage. If there are common terms or common phrases 428, 432, that compare with those used in the present message or messages 340, the commonality detector 340 can identify those commonalities or associations and pinpoint the poster's identity, in step 644. This poster identity information may then be passed to the agent incident routing module 308, in step 648. Any information determined from the messages may be stored in database 400 for future use. The different techniques of detecting possible social media provocateurs may be used as alternatives or may be combined together in different types of arrangements to identify social media provocateurs.

FIG. 7 illustrates a block diagram of a computing environment 700 that may function as servers, computers, or other systems provided herein. The environment 700 includes one or more user computers 705, 710, and 715. The user computers 705, 710, and 715 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 705, 710, 715 may also have any of a variety of applications, including for example, database client and/or server applications, and web browser applications. Alternatively, the user computers 705, 710, and 715 may be any other electronic device, such as a thin-client computer, Internet-enabled mobile telephone, and/or personal digital assistant, capable of communicating via a network 720 and/or displaying and navigating web pages or other types of electronic documents. Although the exemplary computer environment 700 is shown with three user computers, any number of user computers may be supported.

Environment 700 further includes a network 720. The network 720 may can be any type of network familiar to those skilled in the art that can support data communications using any of a variety of commercially-available protocols, including without limitation SIP, TCP/IP, SNA, IPX, Apple-Talk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 702.11 suite of protocols, the Bluetooth™ protocol known in the art, and/or any other wireless protocol); and/or any combination of these and/or other networks.

The system may also include one or more server 725, 730. In this example, server 725 is shown as a web server and server 730 is shown as an application server. The web server 725, which may be used to process requests for web pages or other electronic documents from user computers 705, 710, and 715. The web server 725 can be running an operating system including any of those discussed above, as well as any commercially-available server operating systems. The web server 725 can also run a variety of server applications, including SIP servers, HTTP servers, FTP servers, CGI servers, database servers, Java servers, and the like. In some instances, the web server 725 may publish operations available operations as one or more web services.

The environment 700 may also include one or more file and or/application servers 730, which can, in addition to an operating system, include one or more applications accessible by a client running on one or more of the user computers 705, 710, 715. The server(s) 730 and/or 725 may be one or more general purpose computers capable of executing programs or scripts in response to the user computers 705, 710 and 715. As one example, the server 730, 725 may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the server 725 and/or 730 may be forwarded to a user computer 705 via a web (file) server 725, 730. Similarly, the web server 725 may be able to receive web page requests, web services invocations, and/or input data from a user computer 705 and can forward the web page requests and/or input data to the web (application) server 730. In further embodiments, the web server 730 may function as a file server. Although for ease of description, FIG. 6 illustrates a separate web server 725 and file/application server 730, those skilled in the art will recognize that the functions described with respect to servers 725, 730 may be performed by a single server and/or a plurality of specialized servers, depending on implementation-specific needs and parameters. The computer systems 705, 710, and 715, web (file) server 725 and/or web (application) server 730 may function as the system, devices, or components described in FIGS. 1-4.

The environment 700 may also include a database 735. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. The database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. The database 7 35 may be a relational database, such as Oracle 10i™, that is adapted to store, update, and retrieve data in response to SQL-formatted commands.

FIG. 8 illustrates one embodiment of a computer system 800 upon which the servers, computers, or other systems or components described herein may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage devices 820. By way of example, storage device(s) 820 may be disk drives, optical storage devices, solid-state storage devices such as a random access memory ("RAM") and/or a read-only memory ("ROM"), which can be programmable, flash-updateable and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. The computer system 800 may also include a processing acceleration unit 835, which can include a DSP, a special-purpose processor, and/or the like.

The computer-readable storage media reader 825 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 830 may permit data to be exchanged with the network 820 (FIG. 8) and/or any other computer described above with respect to the computer system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 840, including an operating system 845 and/or other code 850. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A method of analyzing and managing communications on a social network comprising:
   communicating, by a processor, with a first and a second social media network through a social media gateway;
   automatically receiving, by the processor, a first social media message from the first social media network through the social media gateway;
   automatically receiving, by the processor, a second social media message from the second social media network through the social media gateway;
   automatically applying a content filter to the first social media message through the social media gateway, wherein the content filter is determined based on a rule stored in a rule database;

detecting, by the processor, nefarious conduct associated with the first social media message, comprising automatically analyzing one or more of a content and a source of the first social media message with a dialog system and comparing the one or more of the content and the source with information stored in one or more of a text processing rules database, a message history database, and a customer relationship management database;

automatically detecting, by the processor, an identity of a common poster of the first and second social media messages with the dialog system, comprising detecting a commonality between the first and second social media messages;

automatically routing, by the processor, the first and second social media messages and the identity of the common poster of the first and second social media messages to a first agent through an agent interface; and automatically minimizing, by the processor, the impact of the nefarious conduct, comprising one or more of sending an automatic response to one or more of the first and second social media networks through the social media gateway, reporting the identity of the common poster to one or more of the first and second social media networks through the social media gateway, and blocking content from the common poster through the social media gateway.

2. The method as defined in claim 1, wherein detecting nefarious conduct associated with the first social media message comprises detecting an identity of a provocateur associated with the first social media message, wherein the identity the provocateur is associated with the first social media network.

3. The method as defined in claim 2, wherein detecting the identity of the provocateur associated with the first social media message comprises:
determining, by the processor, the source of the first social media message;
identifying, by the processor, an incongruency between the first social media message and a stored data on a message database; and
providing, by the processor, the identity of the provocateur to one of the first agent or a second agent.

4. The method as defined in claim 3, wherein identifying the incongruency comprises at least one of:
comparing the first social media message with an organizational message stored on the message database;
identifying the incongruency between the first social media message and the organizational message;
analyzing metadata associated with the first social media message;
identifying the incongruency between the metadata and the stored data on the message database; and
wherein the incongruency identifies an imposter.

5. The method as defined in claim 2, wherein detecting the provocateur associated with the first social media message comprises:
receiving information regarding two or more social media posters;
retrieving past social media messages associated with the two or more social media posters from a message database;
comparing the two or more social media posters with information in the past social media messages;
identifying the two or more social media posters as a team; and providing information associated with the team to one of the first agent or a second agent.

6. The method as defined in claim 5, wherein the team is a social media troll.

7. The method as defined in claim 2, wherein detecting the provocateur associated with the first social media message comprises:
identifying at least one of a common word or a common phrase in the first social media message;
comparing the at least one common word or common phrase in the first social media message to at least one common word or phrase stored in a past message database;
identifying a commonality between the at least one common word or common phrase in the first social media message and the at least one common word or common phrase stored in the past message database; and
providing information about the commonality to one of the first or a second agent.

8. The method as defined in claim 7, wherein the commonality identifies the social media provocateur.

9. The method as defined in claim 1, further compromising automatically preventing, by the processor, future nefarious conduct by storing information about the provocateur on a database.

10. The method as defined in claim 9, further comprising executing, by the processor, an automated response in response to the identified social media provocateur, wherein executing the automated response comprises retrieving the automated response from an automated response database and delivering the automated response to at least one of the first and second social media networks.

11. A non-transitory computer readable medium having stored thereon processor executable instructions that cause a computing system to execute a method, the instructions comprising:
instructions to communicate with a first and a second social media network;
instructions to automatically receive a first social media message from the first social media network;
instructions to automatically receive a second social media message from the second social media network;
instructions to automatically apply a content filter to the first social media message, wherein the content filter is determined based on a rule stored in a rule database;
instructions to detect nefarious conduct associated with the first social media message, wherein detecting nefarious conduct associated with the first social media message comprises automatically analyzing one or more of a content and a source of the first social media message, comparing the one or more of the source with information stored in one or more of a text processing rules database, a message history database, and a customer management database;
instructions to automatically detect a provocateur associated with the first social media message, wherein automatically detecting a provocateur associated with the first social media message comprises automatically detecting an identity of a common poster of the first and the second social media messages with the dialog system, and detecting a commonality between the first and second social media messages;
instructions to automatically route the first and second social media messages to a first agent; and
instructions to minimize automatically the impact of the nefarious conduct, comprising one or more of sending an automatic response to one or more of the first and second social media networks, reporting the identity of the common poster to one or more of the first and second social media networks, and blocking content from the common poster.

12. The non-transitory computer readable medium as defined in claim 11, wherein the instructions to automatically detect a provocateur associated with the first social media message comprises:
   instructions to determine the source of the first social media message;
   instructions to compare the first social media message with an organizational message;
   instructions to identify an incongruency between the first social media message and the organizational message, wherein the incongruency identifies an imposter; and
   instructions to provide the identity of the provocateur to one of the first or a second agent.

13. The non-transitory computer readable medium as defined in claim 12, wherein the instructions to automatically detect a provocateur associated with the first social media message comprises:
   instructions to receive information regarding two or more social media posters;
   instructions to retrieve past social media messages associated with the two or more social media posters from a message database;
   instructions to compare the two or more social media posters with information in the past social media messages;
   instructions to identify the two or more social media posters as a team, wherein the team is a social media troll; and
   instructions to provide information associated with the team to one of the first or a second agent.

14. The non-transitory computer readable medium as defined in claim 13, wherein the instructions to detect the provocateur associated with the first social media message comprises:
   instructions to identify at least one of a common word or a common phrase in the first social media message;
   instructions to compare the at least one common word or common phrase in the first social media message to at least one common word or phrase stored in a past message database;
   instructions to identify a commonality between the at least one common word or common phrase in the first social media message and the at least one common word or common phrase stored in the past message database, wherein the commonality identifies the social media provocateur; and
   instructions to provide information about the commonality to one of the first or a second agent.

15. The non-transitory computer readable medium as defined in claim 14, further compromising instructions to prevent automatically future nefarious conduct by storing information about the provocateur on a database.

16. The non-transitory computer readable medium as defined in claim 11, wherein the instructions to automatically detect a provocateur associated with the first social media message comprises:
   instructions to determine a source of the first social media message; and
   instructions to provide the source of the first social media message to one of the first or a second agent.

17. The non-transitory computer readable medium as defined in claim 11, wherein the common poster is a social media troll.

18. The non-transitory computer readable medium as defined in claim 12, wherein the instructions to automatically detect a provocateur associated with the first social media message comprises:
   instructions to analyze meta data associated with the first social media message; and
   instructions to identify the incongruency between the metadata and the stored data on the message database, wherein the incongruency identifies an imposter.

19. The non-transitory computer readable medium as defined in claim 14, wherein the commonality identifies the social media provocateur.

20. The non-transitory computer readable medium as defined in claim 15, wherein the instructions to automatically detect a provocateur associated with the first social media message comprises:
   instructions to execute an automated response in response to the identified social media provocateur, wherein executing the automated response comprises retrieving the automated response from an automated response database and delivering the automated response to at least one of the first and second social media networks.

* * * * *